United States Patent Office 3,567,616
Patented Mar. 2, 1971

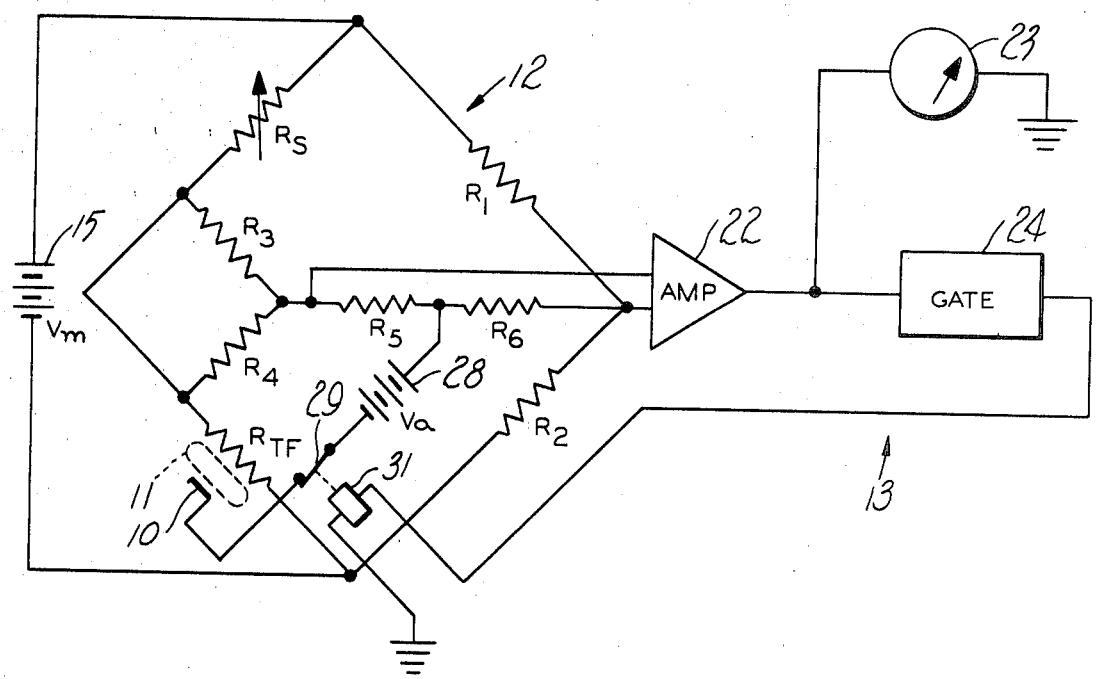
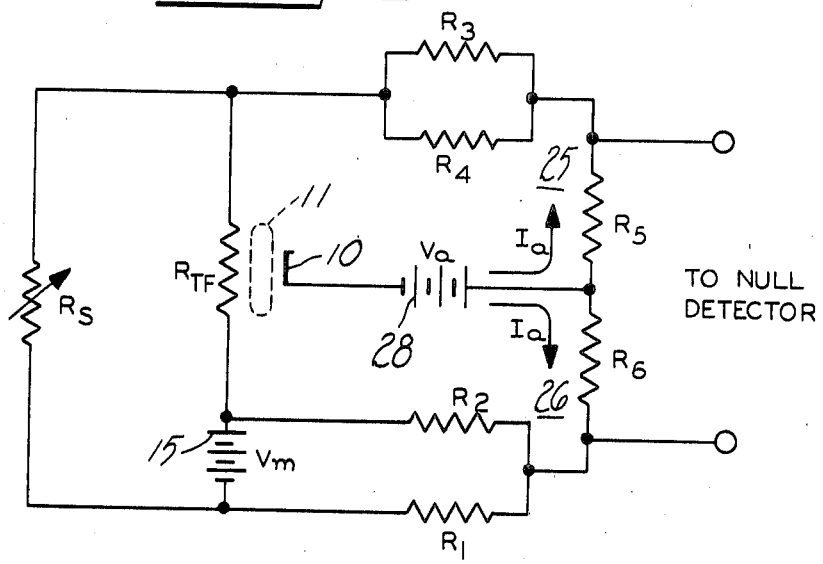
INVENTORS
T. L. CRISMAN
R. C. WARD
By D. W. Marks
ATTORNEY

3,567,616
CIRCUIT FOR SIMULTANEOUSLY ANODIZING AND MEASURING THIN-FILM RESISTORS
Thomas L. Crisman, Alexandria, Va., and Robert C. Ward, Winston-Salem, N.C., assignors to Western Electric Company, Incorporated, New York, N.Y.
Filed Nov. 18, 1968, Ser. No. 776,592
Int. Cl. B01k 3/00
U.S. Cl. 204—228   3 Claims

ABSTRACT OF THE DISCLOSURE

A thin-film resistor, which is to be anodized to increase its resistance to a preselected value, is connected as one arm of a bridge circuit. A pair of equal series connected balancing resistors are connected across the measuring diagonal of the bridge while a D.C. source of measurement voltage is connected across the opposite diagonal. A source of D.C. anodizing current is coupled to the thin-film resistor through an electrolyte and to the junction between the pair of balancing resistors. When the bridge is balanced, the anodization current flows in two equal halves, in opposite directions through the balancing resistors so that a balance detector connected across the balancing resistors is unaffected by the flow of anodization current.

CROSS REFERENCE TO RELATED APPLICATION

This application is related to an application filed in the name of R. C. Ward on even date herewith.

BACKGROUND OF THE INVENTION

(1) Field of the invention

The invention relates to a control circuit for anodizing thin-film resistors. A thin-film resistor may include a layer of resistive metal deposited, by a technique such as sputtering, in a linear pattern upon an insulative substrate. Since it is very difficult to deposit the exact thickness of metal necessary to produce a preselected value of resistance, the usual technique is to initially deposit a thickness of metal greater than desired in order to produce a resistance lower than the preselected value. The resistive film is then anodized to remove some of the metal and reduce the cross-sectional area of the film and thereby increase its resistivity. Anodization is continued until the resistance of the thin-film resistor reaches the desired, preselected value. One problem encountered in anodizing resistors is that precise resistor values cannot be attained if the resistance is not monitored continuously during the anodization process.

(2) Description of the prior art

In the past, different circuits have been developed in which the resistance of a resistor being anodized is monitored by a bridge circuit to stop the flow of anodizing current when the bridge is balanced. In certain of these prior circuits, the resistor is continuously monitored by a D.C. monitoring voltage connected across the bridge. However, in these circuits, the detector connected across the measuring diagonal of the bridge senses a voltage due to both (1) monitoring current flowing through the thin-film resistor; and (2) anodization current flowing through the thin-film resistor. In these circuits, when the bridge is balanced, the detector continues to sense an erroneous voltage due to the flow of anodization current through the resistor.

Another solution which has been proposed in an application Ser. No. 776,396, filed Nov. 18, 1968, in the name of R. C. Ward and assigned to Western Electric Company, Inc. on even date herewith, is that of using an A.C. monitoring voltage and a D.C. anodization current in which the anodization current is connected to the center tap of a transformer winding connected across the measuring diagonal of the bridge. Anodization current is divided into equal parts flowing in opposite directions through the winding and in effect cancels out. However, in this circuit, the use of an A.C. monitoring voltage limits the use of the system with certain types of thin-film resistors. In thin-film resistors having relatively high resistivity, certain capacitive and inductive parameters are unavoidably included which virtually destroy the accuracy of an A.C. measuring system used in an anodization control circuit.

SUMMARY OF THE INVENTION

The object of the invention is a new and improved anodizing control circuit. In one embodiment of the invention, a thin-film resistor, which is to be anodized to increase its resistance to a preselected value, is connected as one arm of a bridge circuit. A pair of equal series connected balancing resistors are connected across the measuring diagonal of the bridge while a D.C. source of measurement voltage is connected across the opposite diagonal. A source of D.C. anodizing current is coupled to the thin-film resistor through an electrolyte and to the junction between the pair of balancing resistors. When the bridge is balanced, the anodization current flows in two equal halves, in opposite directions through the balancing resistors so that a balance detector connected across the balancing resistors is unaffected by the flow of anodization current.

BRIEF DESCRIPTION OF THE DRAWING

The nature of the present invention and its various advantages will appear more fully by referring to the following detailed description in conjunction with the appended drawing, in which:

FIG. 1 is a schematic drawing of an anodizing control circuit constructed in accordance with the invention; and FIG. 2 is a simplified schematic drawing of a portion of FIG. 1 illustrating the current flow within the circuit.

DETAILED DESCRIPTION

Referring to FIG. 1, a thin-film resistor $R_{tf}$ which is to be anodized may comprise a resistive pattern of metallic film deposited upon an insulative substrate, such as tantalum nitride, upon a ceramic. The resistance of the resistor $R_{tf}$ is increased to a preselected value by anodizing the resistive film to reduce the cross-section of conductive material and thereby increase its resistivity. An anodizing current is applied to ther esistor from an electrode 10 through an electrolyte 11 which contacts the resistive film. As the resistive film is anodized, a bridge circuit 12 produces an output signal which is indicative of the variation of the resistance value of the resistive film from a preselected standard value of resistance $R_s$. When the resistive film reaches the preselected value, a monitor circuit 13 connected to the output of the bridge circuit 12 operates to interrupt the flow of anodizing current.

With the thin-film resistor $R_{tf}$ connected as the first arm of the bridge circuit 12, the circuit also includes a second resistive arm $R_s$ which may be adjusted to a preselected standard value, and third and fourth resistive arms $R_1$ and $R_2$, respectively. A pair of resistors $R_3$ and $R_4$ are connected in series between the respective ends of the adjustable resistor $R_s$ and the thin-film resistor $R_{tf}$. The resistance of the parallel combination of the resistors $R_3$ and $R_4$ is chosen to be equal to the parallel combination of the resistors $R_1$ and $R_2$ to insure a balanced flow of anodization current through the thin-film resistor $R_{tf}$ as will be discussed below. For convenience, the resistance values may be chosen so that $R_1=R_2=R_3=R_4$. In the bridge circuit 12, the resistors $R_3$ and $R_4$ are shown in a conventional Kelvin double bridge arrangement wherein the resistors in the positions of $R_3$ and $R_4$ serve to divide the contact resistance and lead resistance error on one side of the bridge similar to the manner in which the resistors $R_1$ and $R_2$ divide these resistances. For certain purposes, contact resistance, even though in the range of a fraction of an ohm, may become significant.

A pair of equal, series connected balancing resistors $R_5$ and $R_6$ are connected from between the junction of the resistors $R_3$ and $R_4$ and the opposite corner of the measuring diagonal of the bridge 12. It should be apparent that although two separate and equal resistances $R_5$ and $R_6$ are shown, a single precisely center-tapped resistor might be substituted.

An amplifier 22 is connected across the balancing resistors $R_5$ and $R_6$ to measure the voltage drop thereacross and consequently detect the point at which the bridge is balanced. Since, ideally, when the bridge is balanced, there is no voltage difference across the measuring diagonal, and the amplifier 22 produces substantially zero output voltage, the output of the amplifier is connected to a gate circuit 24. The gate circuit 24 possesses the characteristic that as long as amplifier 22 produces an output voltage, the output of the gate is inhibited. When the output of the amplifier 22 approaches zero, the gate 24 is triggered and produces a continuous output voltage. The output voltage of the gate 24 is used to actuate an anodization current interrupt relay 31. A voltmeter 23 is also connected to the output of the amplifier 22 and indicates to the operator the nearness to balance of the bridge and when anodization has been completed.

The positive terminal of a D.C. anodizing current source 28 is connected to the junction point between the two balancing resistors $R_5$ and $R_6$ and the negative terminal of the voltage source 28 is connected through normally closed contacts 29 of an anodization current interrupt relay 31 to a cathode electrode 10. The cathode electrode 10 is in electrical anodizing contact with the thin-film resistor $R_{tf}$ through a body of electrolyte 11 which might be a solution of 0.01% citric acid. The anodization current source 28 may be arranged to deliver values of anodization current ranging from 10 microamps to one milliamp depending upon the surface area of the resistive material to be anodized.

In operation, a D.C. measurement voltage is applied from the power source 15 to the source diagonal of the bridge 12. The standard resistor $R_s$ is set to be equal to the final preselected value of resistance to which the thin-film resistor $R_{tf}$ is to be anodized. Since each of the resistors $R_1$, $R_2$, $R_3$ and $R_4$ are equal (2K ohms when $R_s$ is in the range of 8K ohms) and the thin-film resistor $R_{tf}$ is initially of very low value, the bridge 12 is unbalanced and a voltage exists across the measuring diagonals of the bridge and hence across the balancing resistors $R_5$ and $R_6$. The output which is produced by the amplifier 22 inhibits the operation of the gate 24 and the relay 31 remains unoperated. The closed contacts 29 of the unoperated relay 31 connect anodization current to the cathode electrode 10.

The thin-film resistor $R_{tf}$ continues to be anodized and its value is increased toward that resistance preselected for the standard resistor $R_s$. When the value of the thin-film resistor $R_{tf}$ is increased to become equal to the value of the standard resistor $R_s$, the bridge circuit 12 becomes balanced so that no measuring current flows through the balancing resistors $R_5$ and $R_6$. A zero voltage across the resistors permits the output of the amplifier 22 to become zero and the output of the gate 24 to increase. The output voltage from the gate 24 actuates the relay 31 to open the contacts 29 and interrupt the flow of anodization current from the source 28.

A particular feature of the invention resides in the fact that as the bridge circuit 12 approaches the point of balance, the only voltage across the balancing resistors $R_5$ and $R_6$ is due to the flow of measuring current. There is no contribution of voltage across the balancing resistors due to the flow of anodization current. The manner in which this is accomplished, may be illustrated by referring to FIG. 2. Since the resistors $R_1$, $R_2$, $R_3$ and $R_4$ are all equal, the resistance from the point between the two serially connected balancing resistors $R_5$ and $R_6$ around the two adjacent branches of the circuits 25 and 26 are equal. Since the D.C. monitoring source $V_m$ is included in the branch 26 of the circuit, its polarity determines whether the portion of anodizing current flowing through $R_5$ is greater than that portion flowing through $R_6$. However, it should be noted that regardless of the polarity of the source $V_m$, when $R_{tf}$ is equal to $R_s$, the currents flowing in opposite directions through the two balancing resistors $R_5$ and $R_6$ due to anodization current are equal.

As can be seen from FIG. 2, as the bridge 12 approaches a balance condition, the unbalanced flow of anodization current through the balancing resistors $R_5$ and $R_6$ becomes less unbalanced, and as the bridge 12 reaches a balance condition, the two halves of anodization current exactly cancel one another out so that the voltage across the balancing resistors immediately indicates a condition of balance and affects the interruption of the anodization current.

The use of pure D.C. voltages within this anodization control circuit greatly facilitates the anodization of thin-film resistors having inductive or capacitive characteristics to precise values.

It is to be understood that the above-described embodiments are simply illustrative of the invention and that many other embodiments can be devised without departing from the scope and spirit of the invention.

What is claimed is:
1. A circuit for controlling the anodization of a thin-film resistor to increase the resistance of said resistor to a preselected value, comprises:
  a bridge circuit having said thin-film resistor connected as a first arm, a resistor equal to said preselected value connected as a second arm, and a pair of equal resistors connected, respectively, as third and fourth arms of said bridge;
  a D.C. voltage source connected across the first and second arms of said bridge to provide a standard reference voltage for measuring the resistance of said first arm;
  a first resistor having a value equal to the parallel combination of the third and fourth resistive arms of said bridge connected in series with a pair of series connected, equal balancing resistors, said series connected first resistor and balancing resistors being connected across the measuring arm of said bridge;
  a source of anodizing voltage having first and second oppositely poled terminals;
  means, including a cathode electrode connected to the first terminal of said source, for applying anodizing current from said source to said thin-film resistor to anodize said resistor and increase its resistance;
  means connecting the second terminal of said source to the point of connection between said pair of balancing resistors for dividing the flow of anodizing current when said bridge is balanced into two equal halves, flowing in opposite directions through said balancing resistors so that there is no voltage drop across said pair of balancing resistors due to the flow of anodization current; and detector means connected across said pair of balancing resistors and responsive to a condition of zero voltage across said balancing resistors for interrupting the flow of anodization current.

2. A circuit as set forth in claim 1 wherein said bridge circuit is of the balanced Kelvin bridge type.

3. A circuit as set forth in claim 2 wherein said detector means includes:

an amplifier connected across said pair of balancing resistors, said amplifier producing zero output voltage when said bridge is at a null condition; and means responsive to a zero output voltage from said amplifier for interrupting the flow of anodizing current.

References Cited
UNITED STATES PATENTS

| | | | |
|---|---|---|---|
| 3,341,444 | 9/1967 | Chapelle | 204—228 |
| 3,341,445 | 9/1967 | Gerhard | 204—228 |
| 3,365,379 | 1/1968 | Kaiser | 204—228X |
| 3,496,087 | 2/1970 | Goodwin | 204—228 |

JOHN H. MACK, Primary Examiner

D. R. VALENTINE, Assistant Examiner